(12) United States Patent
Guest

(10) Patent No.: US 7,410,193 B2
(45) Date of Patent: Aug. 12, 2008

(54) TUBE COUPLINGS

(75) Inventor: John Derek Guest, Maidenhead (GB)

(73) Assignee: John Guest International Limited, Middlesex (GB)

( * ) Notice: Subject to any disclaimer, the term of this patent is extended or adjusted under 35 U.S.C. 154(b) by 49 days.

(21) Appl. No.: 11/402,103

(22) Filed: Apr. 11, 2006

(65) Prior Publication Data

US 2006/0181080 A1  Aug. 17, 2006

Related U.S. Application Data

(63) Continuation of application No. 10/427,078, filed on Apr. 30, 2003, now Pat. No. 7,100,948.

(30) Foreign Application Priority Data

Apr. 30, 2002  (GB)  ................. 0209897.8

(51) Int. Cl.
*F16L 17/00* (2006.01)
(52) U.S. Cl. ............... 285/376; 285/322; 285/402
(58) Field of Classification Search ........... 285/401, 285/402, 360, 376, 396, 906, 377, 354
See application file for complete search history.

(56) References Cited

U.S. PATENT DOCUMENTS

| | | | |
|---|---|---|---|
| 2,452,277 A | 10/1948 | Woodling | |
| 2,475,741 A | 7/1949 | Goeller | |
| 2,640,716 A | 6/1953 | Bigelow | |
| 2,728,895 A | 12/1955 | Clark | |
| 2,953,398 A | 9/1960 | Haugen et al. | |
| 3,107,108 A | 10/1963 | Greene | |
| 3,180,664 A | 4/1965 | Franck | |
| 3,233,924 A | 2/1966 | Stanley et al. | |
| 3,250,550 A | 5/1966 | Lyon | |
| 3,334,661 A | 8/1967 | Milette | |
| 3,380,765 A | 4/1968 | Himmel | |
| 3,434,744 A | 3/1969 | Paterson et al. | |

(Continued)

FOREIGN PATENT DOCUMENTS

EP  0 384 516 B1  8/1900

(Continued)

*Primary Examiner*—Aaron M Dunwoody
(74) *Attorney, Agent, or Firm*—Workman Nydegger

(57) ABSTRACT

A tube coupling has a coupling body with a throughway open at one end to receive an end portion of a tube. A seal encircles the throughway to seal with the periphery and end of the tube and a cap is mounted on the body having a tube locking device rotatably mounted in the cap to engage and hold the tube in the cap. The cap and body have interengaging means which guide the cap on the body in an axial direction along the body with rotation of the cap from a first position in which a tube can be inserted through the cap and into the seal in the throughway and retained by the locking device and a second position advanced along the coupling body from said one end in which the tube end is held positively in engagement with the seal in the throughway. The locking device engages via a ring with the coupling body to resist rotation of the locking device with respect to the body whereby rotation of the cap between said the first and second positions does not cause the tube to rotate.

20 Claims, 3 Drawing Sheets

U.S. PATENT DOCUMENTS

| | | |
|---|---|---|
| 3,454,290 A | 7/1969 | Tairraz |
| 3,552,781 A | 1/1971 | Helland |
| 3,679,241 A | 7/1972 | Hoffmann |
| 3,747,964 A | 7/1973 | Nilsen, Jr. |
| 3,834,742 A | 9/1974 | McPhillips |
| 3,909,046 A | 9/1975 | Legris |
| 3,989,283 A | 11/1976 | Pepper |
| 4,005,883 A | 2/1977 | Guest |
| 4,025,093 A | 5/1977 | Leczycki |
| 4,062,572 A | 12/1977 | Davis |
| 4,136,897 A | 1/1979 | Haluch |
| 4,188,051 A | 2/1980 | Burge |
| 4,253,686 A | 3/1981 | Aitken et al. |
| 4,298,222 A | 11/1981 | Davies |
| 4,305,606 A | 12/1981 | Legris |
| 4,309,050 A | 1/1982 | Legris |
| 4,335,908 A | 6/1982 | Burge |
| 4,613,158 A | 9/1986 | Ekman |
| 4,637,636 A | 1/1987 | Guest |
| 4,655,159 A | 4/1987 | McMills |
| 4,867,489 A | 9/1989 | Patel |
| 4,993,755 A | 2/1991 | Johnston |
| 5,056,829 A | 10/1991 | Kramer |
| 5,121,949 A | 6/1992 | Reese |
| 5,150,924 A | 9/1992 | Yokomatsu et al. |
| 5,181,751 A | 1/1993 | Kitamura |
| 5,217,261 A | 6/1993 | DeWitt et al. |
| 5,362,110 A | 11/1994 | Bynum |
| 5,388,866 A | 2/1995 | Schlosser |
| 5,466,019 A | 11/1995 | Komolrochanapron |
| 5,498,043 A | 3/1996 | Goldenberg |
| 5,593,186 A | 1/1997 | Harris |
| 5,607,190 A | 3/1997 | Exandier et al. |
| 5,957,509 A | 9/1999 | Komolrochanapron |
| 6,056,326 A | 5/2000 | Guest |
| 6,095,572 A | 8/2000 | Ford et al. |
| 6,139,194 A * | 10/2000 | Bella et al. .................... 385/73 |
| 6,193,239 B1 | 2/2001 | Fukano et al. |
| 6,293,595 B1 | 9/2001 | Marc et al. |
| 6,623,047 B2 * | 9/2003 | Olechnowicz et al. ...... 285/328 |
| 2002/0109353 A1 | 8/2002 | Guest |
| 2002/0135184 A1 | 9/2002 | Snyder, Sr. et al. |
| 2003/0006610 A1 | 1/2003 | Werth |
| 2003/0085568 A1 | 5/2003 | Guest |
| 2004/0032125 A1 | 2/2004 | Rehder et al. |

FOREIGN PATENT DOCUMENTS

| | | |
|---|---|---|
| EP | 0 301 916 A2 | 2/1989 |
| EP | 0 694 724 B1 | 1/1996 |
| EP | 0 939 267 B1 | 9/1999 |
| EP | 0 945 662 A2 | 9/1999 |
| EP | 1 087 168 A1 | 3/2001 |
| EP | 1 233 225 A1 | 8/2002 |
| EP | 1 310 720 A2 | 5/2003 |
| EP | 1 359 362 A1 | 11/2003 |
| EP | 1 359 363 A2 | 11/2003 |
| EP | 1 398 559 A1 | 3/2004 |
| FR | 2 227 483 | 11/1974 |
| FR | 2 394 736 | 1/1979 |
| FR | 2 689 205 | 10/1993 |
| GB | 1 520 742 | 8/1978 |
| GB | 1 555 261 | 11/1979 |
| GB | 2 167 147 A | 5/1986 |
| WO | WO 95/28593 | 10/1995 |
| WO | WO 01/61235 A1 | 8/2001 |

* cited by examiner

TUBE COUPLINGS

CROSS-REFERENCE TO RELATED APPLICATIONS

This application is a continuation of U.S. patent application Ser. No. 10/427,078, filed Apr. 30, 2003, now U.S Pat. No. 7,100,948 which claims priority to United Kingdom Application No. 0209897.8 filed Apr. 30, 2002, the contents of which are incorporated herein by specific reference.

BACKGROUND OF THE INVENTION

1. The Field of the Invention

The invention relates to tube couplings. It is an object of the invention to provide a coupling with enhanced sealing for the tube without voids between the tube and coupling surfaces in which fluids may be trapped and fester.

2. The Relevant Technology

EP-A-1233225 discloses a tube coupling to receive and hold a tube comprising a coupling body having a throughway open at one end to receive a tube. An annular step is formed in the throughway facing the open end to receive an end of a tube. An end cap is screwed on to the coupling body for axial movement between forward and retracted position on the coupling body, the end cap having an opening for the tube to extend through. A seal is located in the coupling body between the step and the open end of the body. The seal has an annular sleeve encircling the throughway and an out-turned annular flange at one end lying against the annular step to receive and seal with an end of the tube inserted into the throughway. A compression device in the throughway is operable to compress the sleeve around the outer surface of the tube adjacent said end of the tube as the end cap is screwed on to the coupling body into the forward position.

SUMMARY OF THE INVENTION

This invention provides a tube coupling comprising a coupling body having a throughway open at one end to receive an end portion of a tube, a seal encircling the throughway to seal with the periphery and end of the tube and a cap mounted on the body having a tube locking device rotatably mounted therein the cap to engage and hold the tube in the cap in the axial direction out of the cap, the cap and body having interengaging means which guide the cap on the body in an axial direction along the body with rotation of the cap from a first position in which a tube can be inserted through the cap and into the seal in the throughway and retained by the locking device and a second position advanced along the coupling body from the end thereof in which the tube end is held positively in engagement with the seal in the throughway, wherein means are provided to resist rotation of the locking device with respect to the coupling body whereby rotation of the cap between said first and second positions does not cause the tube to rotate.

In a preferred arrangement according to the invention an annular member is provided in the cap acting between the coupling body and tube locking device to resist rotation of the locking device with respect to the coupling body.

More specifically, the annular member and an end of the coupling body have interengaging teeth to resist rotation of the annular member with respect to the coupling body.

Furthermore, wherein the annular member and the tube locking device may have interengaging teeth to resist rotation of the locking device with respect to the coupling body.

In one particular construction the annular member may comprise a sleeve which engages in the open end of the throughway of the coupling body and has an out-turned flange overlying the end of the coupling body, the end of the coupling body and side of the flange facing the coupling body having interengaging teeth to resist rotation of the annular member with respect to the coupling body and the other side of the flange and tube locking device having interengaging teeth to resist rotation of the tube locking device with respect to the coupling body.

In any of the above arrangements the locking device may comprise a collet having an annular head located on the outer side of the cap and having a plurality of resilient arms projecting into the cap, the arms having interengaging teeth for engaging the tube extending through the collet into the coupling body and the cap having a tapered cam surface converging towards the open end of the cap remote from the coupling body with which the arms of the collet are engageable to be pressed inwardly with outward movement of the collet with respect to the cap to engage and grip the tube extending through the collet.

In the latter arrangement the ends of the arms of the collet projecting into the cap may have teeth for interengaging with the teeth of the annular member for resisting rotation of the collet with the cap.

BRIEF DESCRIPTION OF THE DRAWINGS

The following is a description of a specific embodiment of the invention, reference being made to the accompanying drawings in which.

DETAILED DESCRIPTION OF THE PREFERRED EMBODIMENTS

Figure 1:
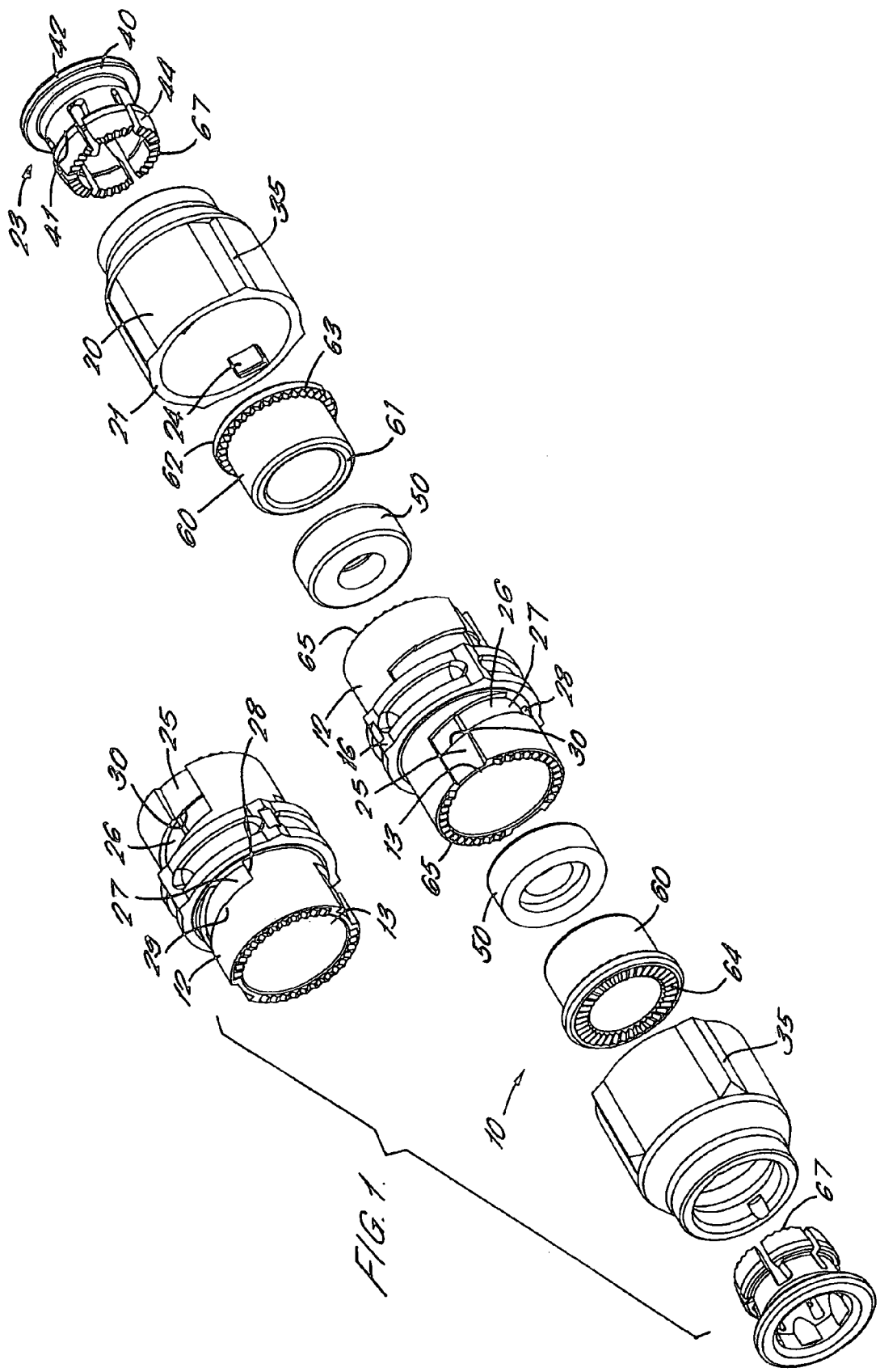
FIG. 1 is a exploded view of an inline tube coupling having identical tube connectors at each end thereof.
Figure 2:
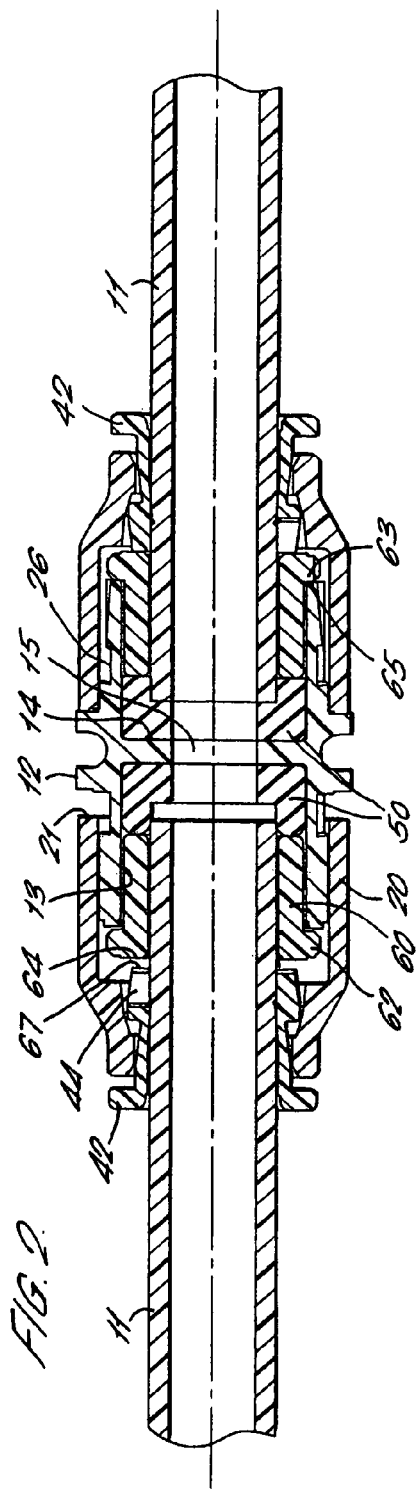
FIG. 2 is a cross-sectional view through the coupling of FIG. 1 with the components of the coupling fully assembled with tubes, one tube being located in an initial engagement position and the other being fully engaged.

Referring firstly to FIG. 1 of the drawing, there is shown a double ended inline tube coupling indicated generally at 10 for connecting together two in line tubes indicated at 11 in FIG. 2.

The coupling comprises a central cylindrical coupling body 12 having a throughway 13 and an integral annular internal wall 14 located centrally in the throughway with a central aperture 15 for flow of fluid from tube to tube through the coupling.

The outer side of the coupling body has an encircling outer wall 16 formed integrally with the coupling body centrally along the body. The periphery of the outer wall is formed with four equally spaced abutments extending across the outer periphery of the wall and between the abutments the wall has shallow recesses. The raised abutments provide finger grips to enable the coupling body to be held against rotation during assembly and disassembly of tubes with the coupling as described later.

End caps 20 are engagable over the portions of the coupling body to either side of the central wall. The end caps are generally of cylindrical form having an open end 21 to receive an end portion of the cylindrical body 12 and having a reduced diameter socket 22 at the other end in which a collet 23 is engagable to receive and lock a tube in the end cap as describe later.

The open end 21 of the end cap has two shallow lugs 24 formed integrally with the wall of the end cap at diametrically spaced locations across the end cap. Each end portion of the cylindrical body 12 has in its outer surface axially extending grooves 25 formed at diametrically spaced locations around the coupling body leading towards the central wall 16. The grooves are dimensioned to receive the lugs 24 on the inner surface of the cap with a close fit and to guide the cap axially onto the coupling body.

Near to the central wall 16 the grooves 25 lead into helically wound grooves 26 extending a short distance of approximately one quarter of the circumference around the cylindrical body. The grooves 26 are dimensioned to receive the lugs 24 in the cap to allow the cap to rotate and at the same time to advance axially with respect to the coupling body. The grooves 26 run out at the wall 16 in a short end section 27 parallel to the wall which terminates with an end stop 28 at the end of the groove. The side of each groove remote from the wall is formed with a shallow projection where the groove changes from the helical portion 26 to the end section 27 to retain the lugs 24 in the parallel section of the groove adjacent the end.

The axial portion of the groove 25 has a shallow ramp 30 over which the lugs 24 rides immediately before entering the helically groove section 26. The ramps serve to define a first position of assembly of the cap 20 on the coupling body and to retain the cap on the coupling body.

Thus in assembling the cap 20 on the coupling body, the cap is initially moved axially onto the coupling body with the lugs 24 sliding along the groove 25 and snapping over the ramps 30. Once past the ramps 30, the cap is then rotated along the helical grooves 26 until it engages in the straight section 27 where it is retained by the projections 29. The arrangement of grooves on the coupling body and abutments in the cap define a first position of location of the cap on the coupling body in which the abutments have just snapped past the ramps in the grooves 25 and a second position in which the cap is rotated through a quarter turn on the coupling body to bring the lugs 24 into engagement with the end sections 28 of the grooves and against the end stop 28. To assist in rotating the cap with respect to the coupling body, the cap has a plurality of axially extending ribs 35 at spaced locations around its outer surface.

As indicated earlier, each cap 20 has a reduced diameter socket 22 at the end remote from the coupling body in which the collet 23 is located to receive and lock a tube in the cap. Each collet 23 comprises an annular portion 40 having a plurality of axially extending spaced resilient arms 41 projecting into the cap and an out turned head 42. The arms 41 have inturned teeth to engage and grip a surface of a tube passing through the collet and have heads 44 at the ends of the arms to engage in an internal tapered frusto-conical cam surface formed in the tapered portion of the cap between the main part and reduced diameter socket 21. Engagement of the heads of the arms with the cam surface causes the arms to be compressed inwardly with outward movement of the collet from the cap to press the teeth of the arms firmly into gripping engagement with the tube and thereby resist withdrawal of a tube from the coupling body.

An arrangement of seals is provided in the throughway 13 in the coupling body to either side of the annular internal wall 14 as follows. Either side of the wall 14 there is an annular seal 50 having an outer sleeve which extends around the throughway and is dimensioned to receive the end of a tube to be sealed in the coupling body. The sleeve has a short inner sleeve formed integrally with the outer sleeve to receive an end face of the tube projecting into the outer sleeve and form a seal therewith. The sleeve 50 is lodged against and supported by the annular internal wall 14.

Next to the sleeve 50 there is a ring member 60 one end of which abuts the sleeve and the other end of which has an encircling flange 62 formed with spaced axially facing teeth 64 on both sides thereof. The ring 60 projects into the open end of the coupling body 12 and the teeth 63 mesh with corresponding teeth 65 formed on the end face of the coupling body to prevent rotation of the ring with respect to the coupling body. Likewise the ends of the arms 41 of the collet are formed with teeth 67 which mesh with the teeth 64 on the flange 62 so that when the collet is in engagement with the flange, the cap can be rotated on the coupling body as described earlier without causing the collet 23 to rotate.

Figure 3:
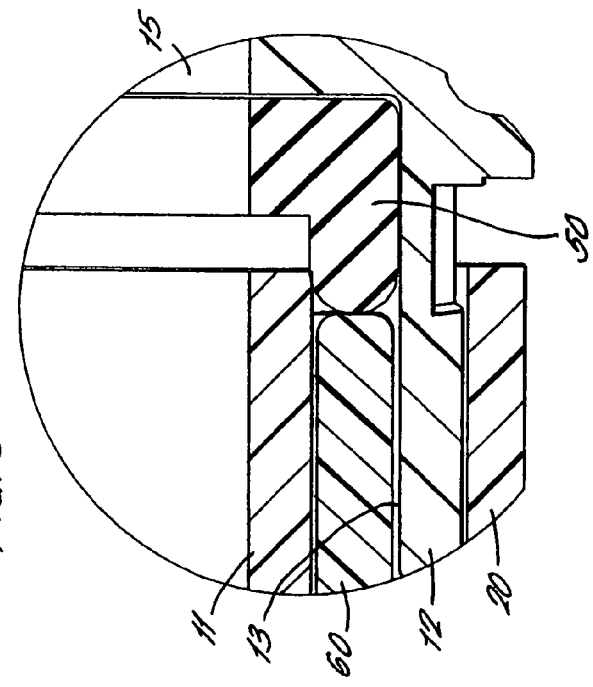
FIG. 3 is an enlarged view of part of the coupling of FIG. 2 showing said one tube in the initially engaged position.

As best seen in the left hand part of the coupling of FIG. 2 and the enlarged view of FIG. 3, a tube is assembled in the coupling body with a cap 20 positioned in the first position defined above in which the abutments 24 in the cap are snapped over the ramps in the grooves 25 but the cap is not advanced further on the coupling body at that stage. The tube to be connected to the coupling body is aligned with the open end of the cap and is inserted through the collet 23 in the cap, through the ring 60, and into the seal 50 in the throughway. The collet automatically grips and retains the tube to prevent the tube from being withdrawn from the coupling body.

Figure 4:
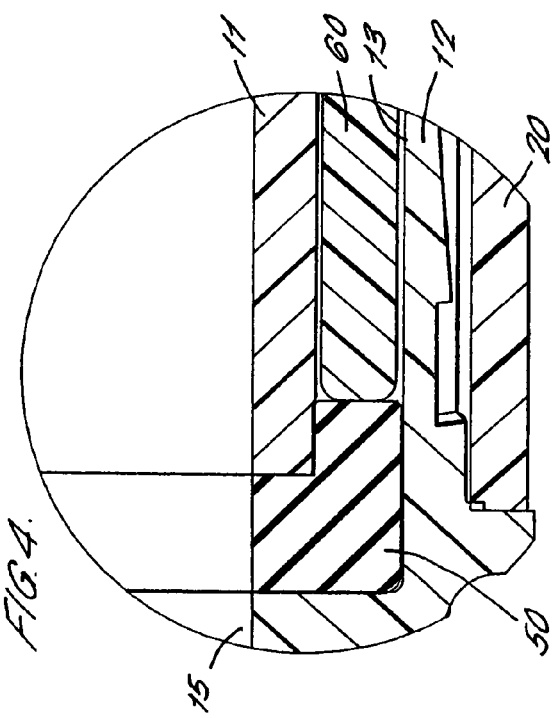
FIG. 4 is a similar view to FIG. 3 showing the other tube in the fully engaged position.

The cap 20 is then rotated through the helical path defined by the grooves 26 to the position shown in the right hand part of FIG. 2 and in FIG. 4 and in so doing is drawn axially along the coupling body. The tube held by the collet is forced further into the throughway in the coupling body and is pressed firmly into the seal with the end of the tube engaging the inner seal. Ultimately the abutments 24 in the cap reach the end portions of the groove and are retained by the shallow projections referred to earlier to hold the cap in the second position of movement with the end of the tube held firmly sealed at the end of the tube by the inner seal and around the outer surface of the tube by the outer seal and O-ring seal.

Because the cap 20 rotates independently of the collet and tube as describe earlier, the tube does not damage the seals in the coupling body as it is forced into full sealing engagement with the seals.

When it is required to detach a tube from the tube coupling, the cap is rotated in the opposite direction back to the first position in its movement at the ends of the axial portions of the groove. The corresponding axial movement of the tube with the cap slightly releases the engagement of the end of the tube in the seal and the collet 23 can then be depressed into the cap to release the gripping engagement of the collet arms with the tube and to allow the tube to be extracted from the coupling body/cap.

The arrangement at the other end of the cap is identical and like parts have been allotted the same reference numerals. It will be appreciated that the arrangement is equally applicable to single tube couplings, elbows, T-joints and any other form of a coupling where a tube is required to be connected to another tube or other device.

It will be appreciated that many modifications may be made to the above described embodiment without departing from the scope of the invention. For example, an annular spacer and an O-ring may be located next to the sleeve in the throughway to receive and encircle a tube extending into the coupling body. The ring member 60 then abuts the other side of the O-ring to provide an additional seal between the tube and coupling body.

Figure 5:
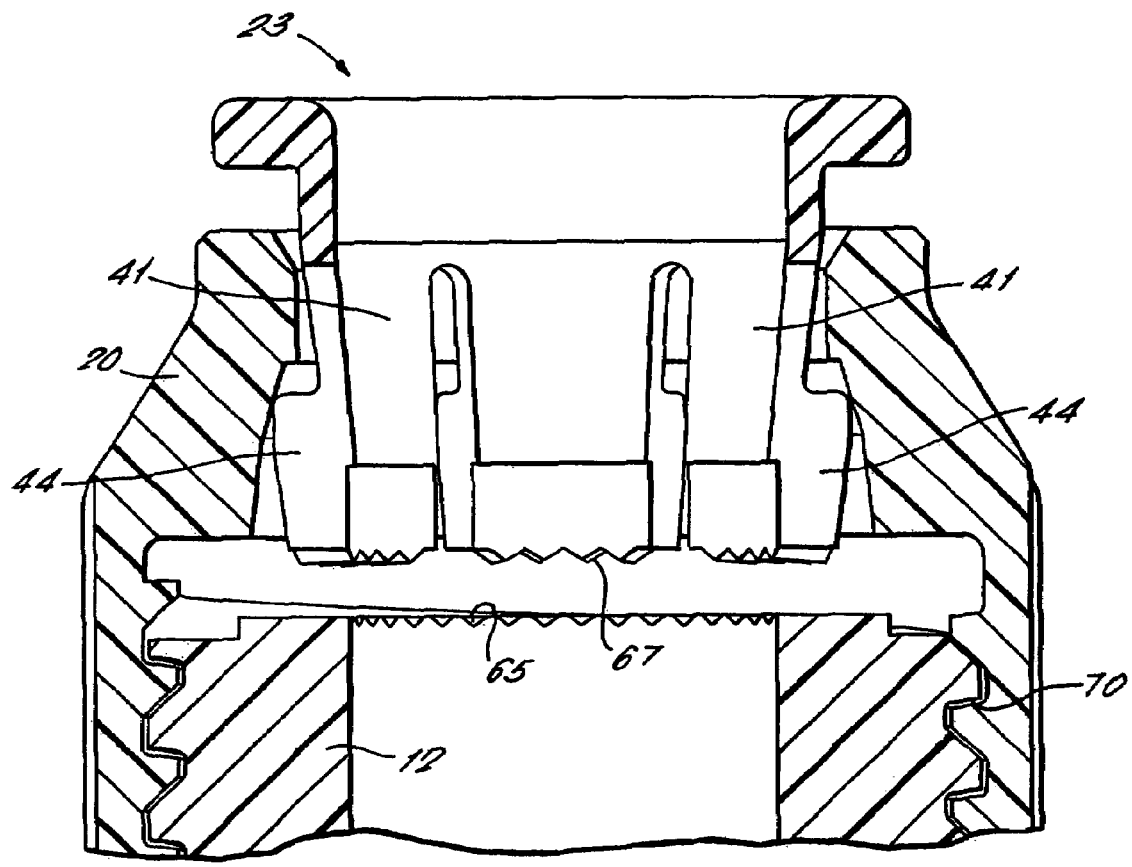
FIG. 5 is a cut-away perspective view of a modified form of the connector.

FIG. 5 of the drawings shows a modified arrangement of the coupling in which ring 60 is omitted and the cap 20 is located on coupling body 12 by means of a coarse screw-thread indicated at 70. The teeth 67 on the ends of the arms of the collet engage directly with the teeth 65 at the end of the coupling body. Thus the separate ring 60 of the first embodiment is eliminated. The construction is otherwise the same as that described earlier.

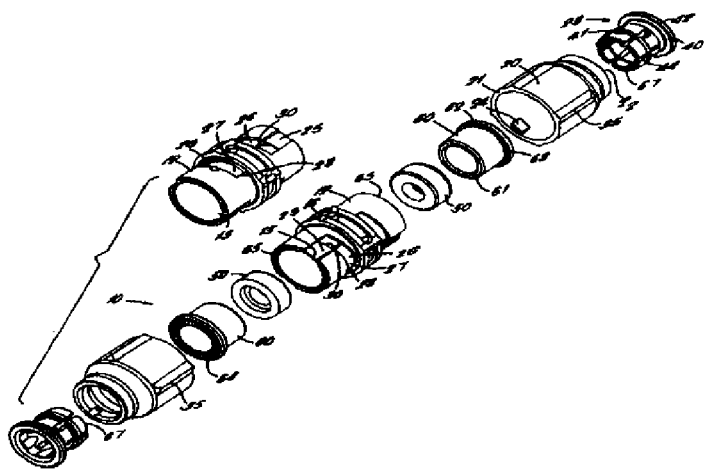

What is claimed is:

1. A tube coupling adapted to receive and hold an end portion of a tube, the end portion having a periphery and a terminal end face, the tube coupling comprising:
    a coupling body having a throughway open at one end, the throughway being adapted to receive the end portion of the tube, the throughway extending through the coupling body so as to allow fluid to pass through the coupling body;
    an annular seal encircling the throughway, the annular seal being adapted to seal with the periphery and the terminal end face of the tube when the tube is received within the throughway;
    a cap mounted on the coupling body, the cap having a tube locking device rotatably mounted therein, the tube locking device being adapted to engage and hold the tube in the cap when the tube is received within the cap;
    means for guiding the cap on the coupling body in an axial direction along the coupling body with rotation of the cap from a first position to a second position; and
    means for resisting rotation of the locking device with respect to the cap whereby rotation of the cap between said first and second positions does not cause the tube to rotate, the means for resisting rotation being disposed on the locking device and the coupling body so as to physically interengage;
    wherein when the cap is in the first position, the tube is retained by the locking device when the tube is inserted through the cap and into the seal in the throughway and when the cap is in the second position, the tube end is held positively in engagement with the seal in the throughway.

2. A tube coupling as claimed in claim 1, wherein the means for resisting rotation comprises teeth formed on the open end of the coupling body and on the locking device, the teeth on the locking device interengaging with the teeth on the coupling body to prevent the locking device from rotating with respect to the coupling body.

3. A tube coupling as claimed in claim 1, wherein the locking device comprises a collet having an annular head with a plurality of resilient arms projecting from the head into the cap.

4. A tube coupling as claimed in claim 1, wherein the means for guiding the cap on the coupling body comprises at least one helical groove formed on an exterior surface of the coupling body and a lug projecting from an interior surface of the cap, the lug in the cap engaging with the at least one helical groove of the coupling body.

5. A tube coupling as claimed in claim 1, wherein said annular seal has a substantially L-shaped transverse cross section.

6. A tube coupling as claimed in claim 3, wherein the means for resisting rotation comprises teeth formed on the open end of the coupling body and on the resilient arms of the collet, the teeth on the resilient arms interengaging with the teeth on the coupling body to prevent the collet from rotating with respect to the coupling body.

7. A tube coupling to receive and hold a tube, the tube coupling comprising:
    a coupling body having an interior surface bounding a throughway that extends through a first end of the coupling body, the first end of the coupling body terminating at an end face;
    an annular seal at least partially disposed within the coupling body;
    a tubular end cap engaging the coupling body for selective movement between a retracted position and a forward position on the coupling body; and
    a collet at least partially disposed within the tubular end cap, the collet having a first end that releaseably interlocks with the end face of the first end of the coupling body such that the collet cannot rotate independent of the coupling body when the tubular end cap is in the forward position.

8. A tube coupling as claimed in claim 7, further comprising:
    teeth formed on the end face of the first end of the coupling body; and
    teeth formed on the first end of the collet, the teeth on the collet releasably interengaging with the teeth on the coupling body.

9. A tube coupling as claimed in claim 7, wherein the collet comprises a plurality of resilient arms, at least one of the arms terminating at an end face having teeth formed thereon, the teeth on the at least one arm of the collet releasably interlocking with teeth formed on the end face of the first end of the coupling body.

10. A tube coupling as claimed in 7, wherein:
    the collet comprises a plurality of resilient arms; and
    the tubular end cap comprises a cam surface which tapers towards an open end of the tubular end cap, the resilient arms of the collet being pressed radially inward by the cam surface when the tubular end cap is moved from the retracted position to the forward position.

11. A tube coupling as claimed in claim 7, wherein:
    the coupling body has an exterior surface with at least one helical groove formed thereon; and
    the tubular end cap has an interior surface with a lug projecting therefrom, the lug engaging with the at least one helical groove of the coupling body.

12. A tube coupling as claimed in claim 7, wherein the annular seal has a substantially L-shaped transverse cross section.

13. A tube coupling as claimed in claim 7, wherein the throughway of the coupling body is adapted to receive a first end of a tube, the first end of the tube terminating at an end face; and the end face of the tube sealing against the annular seal within the coupling body.

14. A tube coupling to receive and hold a tube, the tube coupling comprising:
    a coupling body having an interior surface bounding a throughway that extends through a first end of the coupling body, the first end of the coupling body terminating at an end face;
    an annular seal at least partially disposed within the coupling body;
    an end cap engaging the coupling body for selective movement between a retracted position and a forward position on the coupling body; and
    a collet at least partially disposed within the end cap, the collet having a first end that releaseably interlocks with the end face of the first end of the coupling body, the end cap being rotatable with respect to the collet.

15. A tube coupling as claimed in claim 14, further comprising:
   teeth formed on the end face of the first end of the coupling body; and
   teeth formed on the first end of the collet, the teeth on the collet releasably interengaging with the teeth on the coupling body.

16. A tube coupling as claimed in claim 14, wherein the collet comprises a plurality of resilient arms, at least one of the arms terminating at an end face having teeth formed thereon, the teeth on the at least one arm of the collet releasably interlocking with teeth formed on the end face of the first end of the coupling body.

17. A tube coupling as claimed in claim 14, wherein:
   the collet comprises a plurality of resilient arms; and
   the end cap comprises a cam surface which tapers towards an open end of the end cap, the resilient arms of the collet being pressed radially inward by the cam surface when the end cap is moved from the retracted position to the forward position.

18. A tube coupling as claimed in 14, wherein:
   the coupling body has an exterior surface with at least one helical groove formed thereon; and
   the end cap has an interior surface with a lug projecting therefrom, the lug engaging with the at least one helical groove of the coupling body.

19. A tube coupling as claimed in claim 14, wherein the annular seal has a substantially L-shaped transverse cross section.

20. A tube coupling as claimed in claim 14, wherein the throughway of the coupling body is adapted to receive a first end of a tube, the first end of the tube terminating at an end face; and the end face of the tube sealing against the annular seal within the coupling body.

* * * * *

UNITED STATES PATENT AND TRADEMARK OFFICE
CERTIFICATE OF CORRECTION

PATENT NO. : 7,410,193 B2  Page 1 of 2
APPLICATION NO. : 11/402103
DATED : August 12, 2008
INVENTOR(S) : John Derek Guest It is certified that error appears in the above-identified patent and that said Letters Patent is hereby corrected as shown below:

The title page, should be deleted and substitute therefor the attached title page.

Drawings
Sheet 1, replace Fig 1 with the Fig depicted herein below, wherein, the reduced diameter socket is labeled --22--.

Column 4
Line 8, after "60" insert --,--.

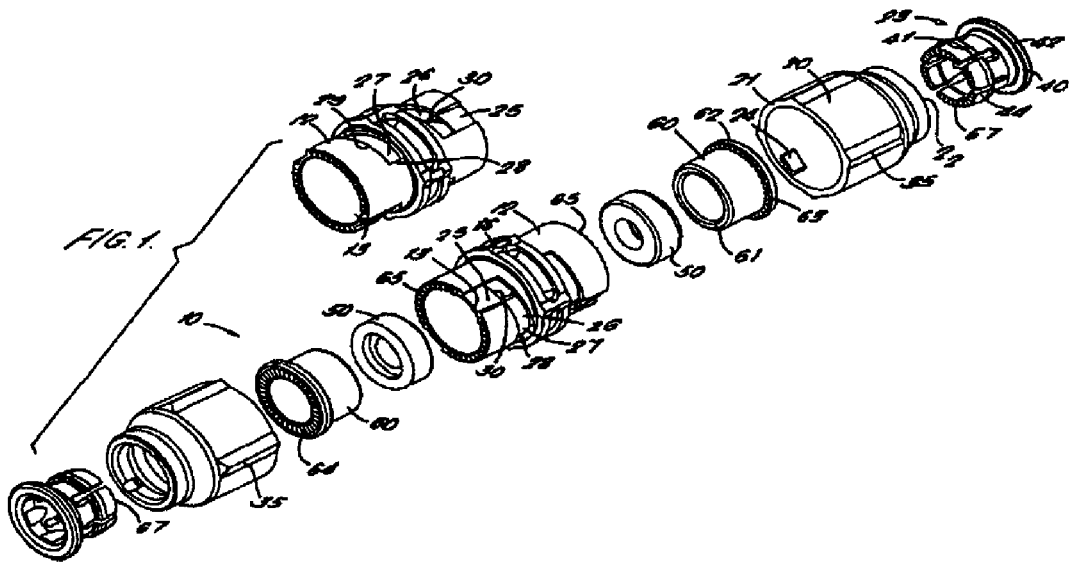

Signed and Sealed this

Ninth Day of June, 2009

JOHN DOLL
*Acting Director of the United States Patent and Trademark Office*

(12) United States Patent
Guest

(10) Patent No.: US 7,410,193 B2
(45) Date of Patent: Aug. 12, 2008

(54) TUBE COUPLINGS

(75) Inventor: John Derek Guest, Maidenhead (GB)

(73) Assignee: John Guest International Limited, Middlesex (GB)

(*) Notice: Subject to any disclaimer, the term of this patent is extended or adjusted under 35 U.S.C. 154(b) by 49 days.

(21) Appl. No.: 11/402,103

(22) Filed: Apr. 11, 2006

(65) Prior Publication Data
US 2006/0181080 A1 Aug. 17, 2006

Related U.S. Application Data

(63) Continuation of application No. 10/427,078, filed on Apr. 30, 2003, now Pat. No. 7,100,948.

(30) Foreign Application Priority Data
Apr. 30, 2002 (GB) ............................... 0209897.8

(51) Int. Cl.
*F16L 17/00* (2006.01)
(52) U.S. Cl. .................... 285/376; 285/322; 285/402
(58) Field of Classification Search ............... 285/401, 285/402, 360, 376, 396, 906, 377, 354
See application file for complete search history.

(56) References Cited

U.S. PATENT DOCUMENTS

| | | |
|---|---|---|
| 2,452,277 A | 10/1948 | Woodling |
| 2,475,741 A | 7/1949 | Goeller |
| 2,640,716 A | 6/1953 | Bigelow |
| 2,728,895 A | 12/1955 | Clark |
| 2,953,398 A | 9/1960 | Haugen et al. |
| 3,107,108 A | 10/1963 | Greene |
| 3,180,664 A | 4/1965 | Franck |
| 3,233,924 A | 2/1966 | Stanley et al. |
| 3,250,550 A | 5/1966 | Lyon |
| 3,334,661 A | 8/1967 | Milette |
| 3,380,765 A | 4/1968 | Himmel |
| 3,434,744 A | 3/1969 | Paterson et al. |

(Continued)

FOREIGN PATENT DOCUMENTS

EP   0 384 516 B1   8/1900

(Continued)

*Primary Examiner*—Aaron M Dunwoody
(74) *Attorney, Agent, or Firm*—Workman Nydegger

(57) ABSTRACT

A tube coupling has a coupling body with a throughway open at one end to receive an end portion of a tube. A seal encircles the throughway to seal with the periphery and end of the tube and a cap is mounted on the body having a tube locking device rotatably mounted in the cap to engage and hold the tube in the cap. The cap and body have interengaging means which guide the cap on the body in an axial direction along the body with rotation of the cap from a first position in which a tube can be inserted through the cap and into the seal in the throughway and retained by the locking device and a second position advanced along the coupling body from said one end in which the tube end is held positively in engagement with the seal in the throughway. The locking device engages via a ring with the coupling body to resist rotation of the locking device with respect to the body whereby rotation of the cap between said first and second positions does not cause the tube to rotate.

20 Claims, 3 Drawing Sheets